W. R. JOHNSON.
Annealing Iron and Steel.
No. 814. Patented June 30, 1838.
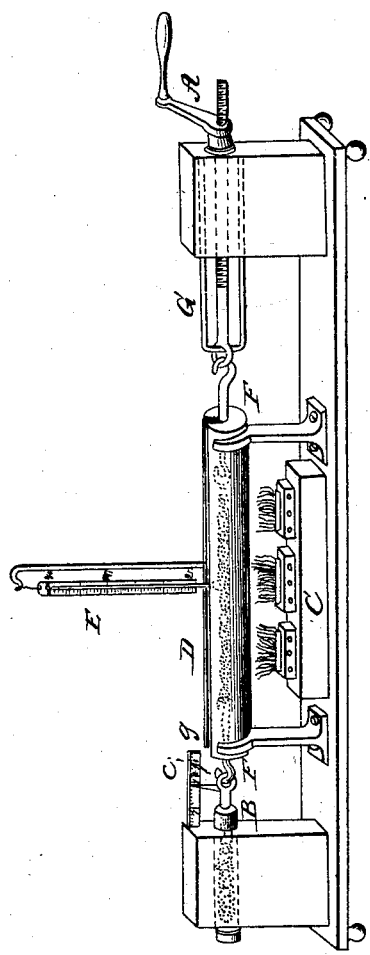
Witnesses:
Inventor:
Walter R. Johnson

UNITED STATES PATENT OFFICE.

WALTER R. JOHNSON, OF PHILADELPHIA, PENNSYLVANIA.

ART OF INCREASING THE STRENGTH OF WROUGHT IRON AND STEEL AND OF ARTICLES FORMED OF SAID MATERIALS.

Specification of Letters Patent No. 814, dated June 30, 1838; Antedated December 30, 1837.

*To all whom it may concern:*

Be it known that I, WALTER R. JOHNSON, of the city of Philadelphia, in the State of Pennsylvania, have invented a new and useful improvement in the manufacture of wrought or malleable iron and steel and of articles formed thereof, being the imparting to said materials of an increase of strength by means of a process which I call "thermotension," and that the following is a full and exact description of the manner of carrying into effect my said improvement.

The said process is founded on the principle that the strength of said materials is increased by means of mechanical stretching or straining, at a high temperature. I perform said process in the following manner: I first determine in the usual way by trial and calculation, what strain might, at the ordinary temperatures of the air, and before my improvement has been applied to it, be sufficient to break the particular piece of metal or manufactured article intended to be improved by the process of thermotension. I then, by means of any suitable apparatus for applying heat and measuring temperature, subject the piece or article to be strengthened to a temperature not exceeding seven hundred degrees Fahrenheit, preferring that of five hundred and fifty degrees for most kinds of iron; not restricting myself however to the same temperature for all kinds of iron and steel but varying to a higher or lower temperature, according as the same shall be found most serviceable for the particular kind which is undergoing the process. When the proper temperature has been attained, I apply by means of any suitable apparatus for applying and measuring mechanical strain, a force equal, or nearly so, to the calculated strength of the specimen or article under process, and continue to apply the same as long as the metal continues to be stretched by it.

I contemplate the application of the improvement and process above described and herein called the process of thermotension to the metals wrought or malleable iron and steel of whatever form, in which an increase of direct cohesion may be found useful, whether the same have been manufactured by rolling, hammering, drawing, or by any other process as I do not confine my improvement to any particular forms of materials or of articles manufactured therefrom.

What I claim as my improvement in the art of manufacturing iron and steel and of articles formed therefrom, is—

The submitting of them while at high temperatures, to mechanical stretching or straining as above specified, for the useful purpose of increasing their direct cohesion, by whatever means the necessary force shall be applied and measured, or the requisite temperatures communicated and regulated.

WALTER R. JOHNSON.

Witnesses:
JOHN BURNS,
THOS. FLETCHER.